(12) United States Patent
Wennersten et al.

(10) Patent No.: US 10,944,967 B2
(45) Date of Patent: Mar. 9, 2021

(54) ENCODER AND DECODER AND METHODS THEREOF

(71) Applicant: Telefonaktiebolaget LM Ericsson (publ), Stockholm (SE)

(72) Inventors: Per Wennersten, Årsta (SE); Alfonso De La Rocha, Madrid (ES); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/477,023

(22) PCT Filed: Dec. 21, 2017

(86) PCT No.: PCT/EP2017/084052
§ 371 (c)(1),
(2) Date: Jul. 10, 2019

(87) PCT Pub. No.: WO2018/130400
PCT Pub. Date: Jul. 19, 2018

(65) Prior Publication Data
US 2019/0342549 A1    Nov. 7, 2019

Related U.S. Application Data

(60) Provisional application No. 62/444,908, filed on Jan. 11, 2017.

(51) Int. Cl.
*H04N 19/117* (2014.01)
*H04N 19/126* (2014.01)
(Continued)

(52) U.S. Cl.
CPC ......... *H04N 19/117* (2014.11); *H04N 19/126* (2014.11); *H04N 19/14* (2014.11); *H04N 19/176* (2014.11); *H04N 19/82* (2014.11)

(58) Field of Classification Search
CPC .... H04N 19/117; H04N 19/126; H04N 19/14; H04N 19/176; H04N 19/82
(Continued)

(56) References Cited

U.S. PATENT DOCUMENTS

| | | | |
|---|---|---|---|
| 2006/0110062 A1* | 5/2006 | Chiang | H04N 19/16 382/260 |
| 2011/0274158 A1* | 11/2011 | Fu | H04N 19/176 375/240.02 |

(Continued)

FOREIGN PATENT DOCUMENTS

| | | |
|---|---|---|
| EP | 0 772 365 A2 | 5/1997 |
| EP | 0 884 911 A1 | 12/1998 |
| JP | 2013236358 A | 11/2013 |

OTHER PUBLICATIONS

International Search Report and Written Opinion dated Mar. 12, 2018 issued in International Application No. PCT/EP2017/084052. (11 pages).

*Primary Examiner* — Jae N Noh
(74) *Attorney, Agent, or Firm* — Rothwell, Figg, Ernst & Manbeck, P.C.

(57) ABSTRACT

Embodiments of the disclosure provide methods, apparatus and computer programs for adaptive loop filtering in an encoder and in a decoder. One method, performed in an encoder, comprises: determining filter parameters for a plurality of filters to be used in encoding a frame or slice; determining respective activity values for each of a plurality of blocks in the frame or slice, wherein each block comprises a plurality of pixels; determining respective quantization parameters for each of the plurality of blocks; selecting, for each of the plurality of blocks, a filter from the plurality of determined filters based on the respective activity value and the respective quantization parameter; and (Continued)

applying the filter parameters for the respective selected filters to the plurality of blocks.

21 Claims, 5 Drawing Sheets

(51) Int. Cl.
*H04N 19/14* (2014.01)
*H04N 19/176* (2014.01)
*H04N 19/82* (2014.01)

(58) Field of Classification Search
USPC .................................................. 375/240.03
See application file for complete search history.

(56) References Cited

U.S. PATENT DOCUMENTS

| | | | |
|---|---|---|---|
| 2012/0082241 A1* | 4/2012 | Tsai | ..................... H04N 19/117 |
| | | | 375/240.25 |
| 2015/0071344 A1* | 3/2015 | Tourapis | ................ H04N 19/51 |
| | | | 375/240.03 |
| 2017/0230656 A1 | 8/2017 | Leontaris et al. | |

* cited by examiner

ENCODER AND DECODER AND METHODS THEREOF

CROSS REFERENCE TO RELATED APPLICATION(S)

This application is a 35 U.S.C. § 371 National Stage of International Patent Application No. PCT/EP2017/084052, filed Dec. 21, 2017, designating the United States and claiming priority to U.S. provisional application No. 62/444,908, filed on Jan. 11, 2017. The above identified applications are incorporated by reference.

TECHNICAL FIELD

Embodiments of the present disclosure relate to media coding, and particularly to methods, apparatus and computer program products for adaptive loop filtering when encoding or decoding a video stream.

BACKGROUND

The embodiments of the present disclosure relate to two existing technologies in the video coding area: Adaptive Quantization and Adaptive Loop Filter.

Adaptive Quantization

Quantization is used in video coding to reduce the amount of data to be coded. Quantization, involved in image processing, is a lossy compression technique achieved by compressing a range of values to a single quantum value. When the number of discrete symbols in a given stream is reduced, the stream becomes more compressible. For example, reducing the number of colors required to represent a digital image makes it possible to reduce its file size.

As a simple example, instead of directly coding a value of 37 the value might be divided by four so 9 is coded instead. During decoding, the number is multiplied by four, so the decoded value is 36. This process saves bits since smaller numbers need to be encoded, but introduces error since the values are no longer perfectly reconstructed. By varying the number we divide and multiply by, we can adjust the tradeoff between bitrate and output quality.

In video coding we use a Quantization Parameter (QP), and the values to be encoded are divided by a factor proportional to $$2^{\frac{QP}{6}}.$$

Therefore, a high QP means low quality and low bitrate, and a low QP means high quality and high bitrate. The QP varies between 1 and 50.

Figure 1:
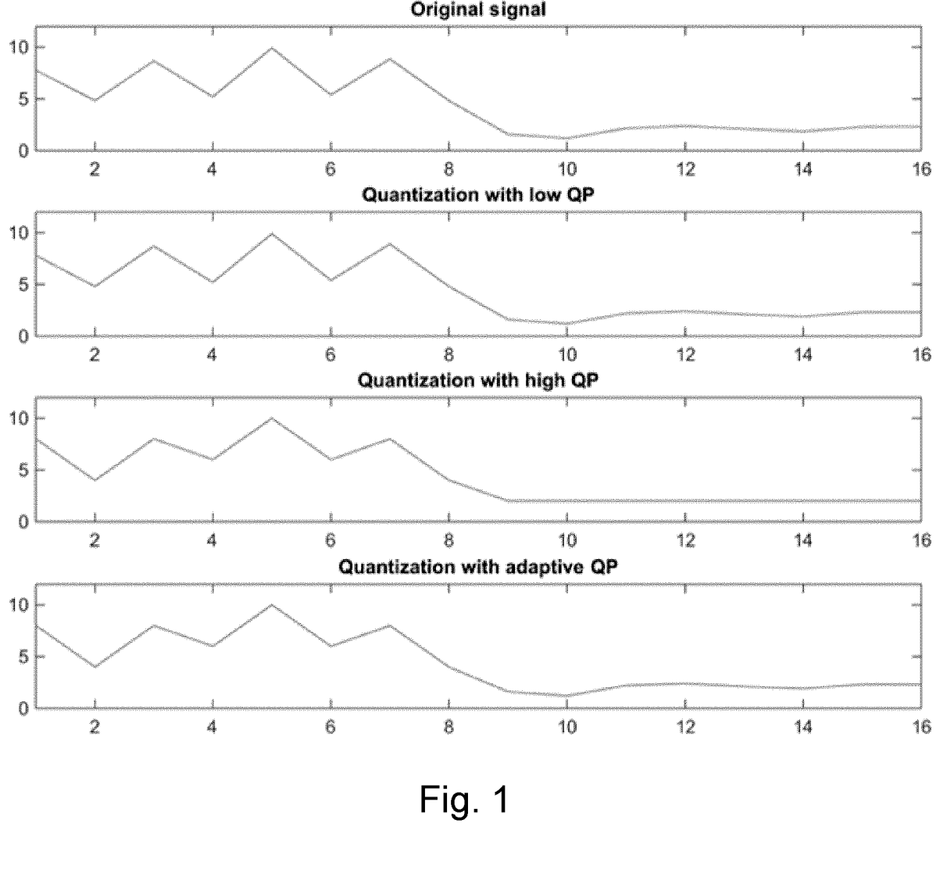
FIG. 1 shows a series of graphs illustrating the effect of different QP values and mechanisms.

When optimizing for subjective video quality, it is beneficial to select different QPs for different parts of a video frame. Parts of the video with high spatial activity or variance can be coded with relatively high QP without noticeable quality degradation. On the other hand, parts of the video with very low spatial activity might need a very low QP to avoid being completely flattened, which would result in an unacceptable loss of quality, subjectively. FIG. 1 illustrates this effect on a one-dimensional signal.

Overall, using a typical adaptive QP algorithm results in around 15% lower bitrate for the same subjective quality compared to using the same QP for an entire frame.

FIG. 1 shows the effects of quantization in one dimension, using low QP, high QP and adaptive AP.

Low QP maintains quality of the signal both in low and high variance areas.

With high QP, high activity areas still look good, but low activity areas are flattened. With adaptive QP, the leftmost eight numbers use high QP and the remaining eight low QP, maintaining acceptable quality for the entire signal.

Adaptive Loop Filtering (ALF)

Adaptive loop filtering for video coding is to minimize the mean square error between original samples and decoded samples by using an adaptive filter.

The adaptive loop filter is applied after coding and other filtering of a frame. First, each block of 2×2 pixels in an image is categorized based on its activity and orientation. If $R(i,j)$ is the value of pixel $(i,j)$ in the reconstructed image, $V(k,l)$ is defined as $|2R(k,l)-R(k,l-1)-R(k,l+1)|$ and $H(k,l)$ is defined as $|2R(k,l)-R(k-1,l)-R(k+1,l)|$. Activity is defined as $\Sigma_{k=i-2}^{i+3} \Sigma_{l=j-2}^{j+3} V(k,l) H(k,l)$. Another activity metric that could be used is the variance of surrounding pixels. There are five categories for different activity levels and four categories for different orientations, for a total of 20 categories. To select activity category, we first calculate Qindex=(24*Activity)>>13. Then, a table is used to determine the category:

0. Qindex=0
1. Qindex=1
2. Qindex=2-6
3. Qindex=7-13
4. Qindex>13

Identical categorization can be done in both the encoder and decoder. The encoder then selects filters for each category, and transmits filter parameters to the decoder. Filtering is then performed for each 2×2 area based on its category.

The relevant part here is the classification based on block activity. This is an important step because blocks with higher activities have lower uncertainty.

If one pixel has a value of 100, its neighbor a value of 200 and both have an uncertainty of ±5, we know that the difference between these pixel values is mostly correct, and should not be filtered too much.

If the values were instead 100 and 110, with an uncertainty of ±5, we are not entirely sure that the values should be different at all, and we could use a much stronger filtering.

SUMMARY

In embodiments of the present disclosure, it is suggested to weigh the block activity used in the adaptive loop filter by a function of the QP. This has the effect of grouping pixels by the level of uncertainty, which enables the encoder to select stronger filters for groups of pixels with a large uncertainty in the pixel values.

The conventional adaptive loop filter was designed without taking adaptive QP into account. Blocks of pixels are categorized based on their activity, which makes some sense: a weak signal might be noise, but a strong signal is probably not. This, however, ignores the effect of the QP selected for each block. For a fixed activity level, a pixel with high QP has much more uncertainty than a pixel with low QP, and therefore should probably have stronger filtering. Instead of simply categorizing based on activity, we should take QP into account as well.

Because the absolute uncertainty in a block is proportional to $$2^{\frac{QP}{6}},$$

we propose effectively dividing the activity by this number to get a better categorization of pixels for adaptive loop filtering. This improves performance when the QP varies within a picture as when adaptive QP is used, but also in other cases when QP varies between pictures but the same ALF parameters are used.

In one or more embodiments of the disclosure, pixel groups (also referred to as blocks) are categorized based on an activity related parameter, wherein the activity related parameter is the activity divided by $A*2^{A QP*B}$, where A and B are constants or a variable as described below. In one embodiment, the activity-related parameter is the activity divided by $$2^{\frac{QP}{6}}.$$

In one aspect, the present disclosure provides a method, performed by an encoder, for adaptive loop filtering. The method comprises: determining filter parameters for a plurality of filters to be used in encoding a frame or slice; determining respective activity values for each of a plurality of blocks in the frame or slice, wherein each block comprises a plurality of pixels; determining respective quantization parameters for each of the plurality of blocks; selecting, for each of the plurality of blocks, a filter from the plurality of determined filters based on the respective activity value and the respective quantization parameter; and applying the filter parameters for the respective selected filters to the plurality of blocks.

In another aspect, the present disclosure provides a method, performed by a decoder, for adaptive loop filtering. The method comprises: receiving filter parameters for a plurality of filters to be used in decoding a picture frame; determining respective activity values for each of a plurality of blocks in the picture frame, wherein each block comprises a plurality of pixels; determining respective quantization parameters for each of the plurality of blocks; selecting, for each of the plurality of blocks, a filter from the plurality of determined filters based on the respective activity value and respective quantization parameter; and applying the filter parameters for the respective selected filters to the plurality of blocks.

The disclosure also provides apparatus for performing the methods set out above. For example, in one aspect, there is provided an encoder for adaptive loop filtering. The encoder comprises: a processor, configured to: determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

In another aspect, the encoder comprises one or more modules configured to implement the methods described above. The modules may be implemented purely in software, purely in hardware, or in a combination of both software and hardware. For example, the encoder may comprise a first module configured to determine filter parameters for a plurality of filters to be used in encoding a frame or slice; a second module configured to determine respective activity values for each of a plurality of blocks in the frame or slice, wherein each block comprises a plurality of pixels; a third module configured to determine respective quantization parameters for each of the plurality of blocks; a fourth module configured to select, for each of the plurality of blocks, a filter from the plurality of determined filters based on the respective activity value and the respective quantization parameter; and a fifth module configured to apply the filter parameters for the respective selected filters to the plurality of blocks.

In a further aspect, the encoder may comprise processing circuitry and a computer-readable medium storing instructions which, when executed by the processing circuitry, cause the encoder to determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

In another aspect, there is provided a decoder for adaptive loop filtering, the decoder comprising: a processor, configured to: receive filter parameters for a plurality of filters to be used in decoding a picture frame; determine respective activity values for each of a plurality of blocks in the picture frame, wherein each block comprises a plurality of pixels; determine respective quantization parameters for each of the plurality of blocks; select, for each of the plurality of blocks, a filter from the plurality of determined filters based on the respective activity value and respective quantization parameter; and apply the filter parameters for the respective selected filters to the plurality of blocks.

In another aspect, the decoder comprises one or more modules configured to implement the methods described above. The modules may be implemented purely in software, purely in hardware, or in a combination of both software and hardware. For example, the decoder may comprise a first module configured to receive filter parameters for a plurality of filters to be used in encoding a frame or slice; a second module configured to determine respective activity values for each of a plurality of blocks in the frame or slice, wherein each block comprises a plurality of pixels; a third module configured to determine respective quantization parameters for each of the plurality of blocks; a fourth module configured to select, for each of the plurality of blocks, a filter from the plurality of determined filters based on the respective activity value and the respective quantization parameter; and a fifth module configured to apply the filter parameters for the respective selected filters to the plurality of blocks.

In a further aspect, the decoder may comprise processing circuitry and a computer-readable medium storing instructions which, when executed by the processing circuitry, cause the decoder to: receive filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

The present disclosure may further be embodied in a computer program and/or a computer program product. For example, one aspect provides a computer program for adaptive loop filtering. The computer program comprises code which, when executed by processing circuitry in an encoder, causes the encoder to: determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

Another aspect provides a computer program for adaptive loop filtering. The computer program comprises code which, when executed by processing circuitry in a decoder, causes the decoder to: receive filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

A further aspect provides a computer program product, comprising a non-transitory computer-readable medium storing instructions which, when executed by processing circuitry in an encoder, causes the encoder to: determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

Another aspect provides computer program product, comprising a non-transitory computer-readable medium storing instructions which, when executed by processing circuitry in a decoder, causes the decoder to: receive filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

One advantage of embodiments of the present disclosure is that adaptive loop filtering can be made more efficient when Adaptive QP is used. This is important since although the reference encoder does not use adaptive QP by default, most commercially viable encoders do. In addition, the performance of ALF on pictures higher up in the temporal hierarchy can be improved, increasing performance even when Adaptive QP is not used.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

According to embodiments of the disclosure, it is suggested to weigh the block activity used in the adaptive loop filter by a function of the QP. This has the effect of grouping pixels by the level of uncertainty, which enables the encoder to select stronger filters for groups of pixels with a large uncertainty in the pixel values. In one embodiment, the pixel groups (also referred to as blocks) are categorized based on an activity related parameter, wherein the activity related parameter may be the activity divided by $A*2^{\Delta QP*B}$, where A and B are constants or a variable as described below. In one embodiment, the activity-related parameter is the activity divided by $$2^{\frac{QP}{6}}.$$

Figure 2A:
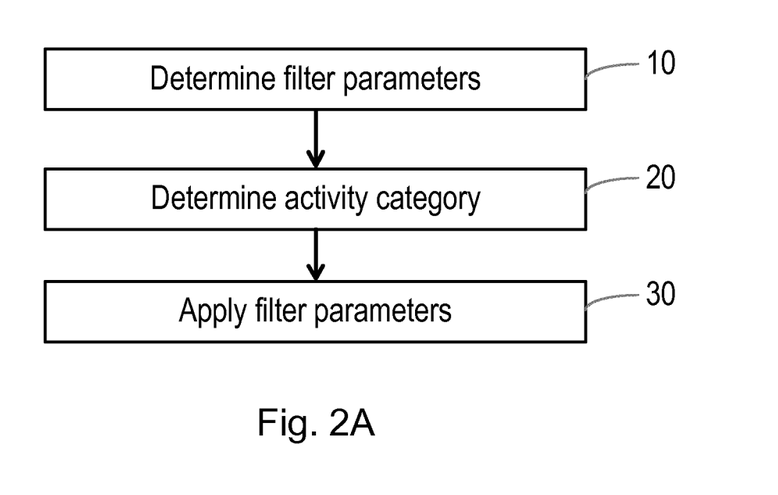
FIG. 2a is a flowchart of a method for adaptive loop filter in an encoder according to embodiments of the disclosure.

FIG. 2a is a flowchart of a method for adaptive loop filtering in an encoder. In step 10, the encoder determines a plurality of filter parameters for a plurality of different filters to be used in encoding a frame or slice. For example, in one embodiment the encoder may determine the parameters for 20 filters. In step 20, the encoder determines an activity category for each block of the frame or slice, where each block comprises a plurality of pixels (e.g., 2×2 pixels) based on an activity-related parameter. In one embodiment, the activity related parameter is an activity divided by $A*2^{\Delta QP*B}$. Then, in step 30, filter parameters for a filter selected from the different filters determined in step 10 are applied on the block based at least on the determined activity category.

Figure 2B:
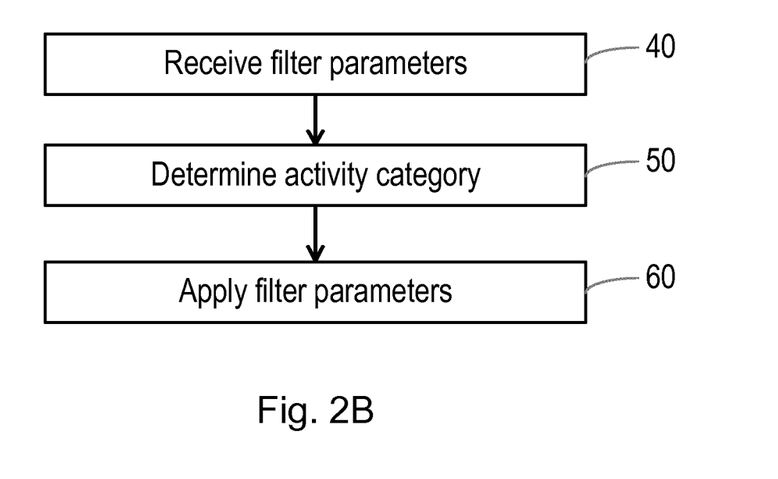
FIG. 2b is a flowchart of a method for adaptive loop filter in a decoder according to embodiments of the disclosure.

FIG. 2b is a flowchart of a method for adaptive loop filtering in a decoder. In step 40, the decoder receives (e.g., from an encoder) a plurality of filter parameters for a plurality of different filters to be used in decoding a frame or slice. In step 50, the decoder determines an activity category for each block of the frame or slice, where each block comprises a plurality of pixels (e.g., 2×2 pixels) based on an activity-related parameter. In one embodiment, the activity related parameter is an activity divided by $A*2^{\Delta QP*B}$. Then, in step 60, filter parameters for a filter selected from the different filters received in step 40 are applied on the block based at least on the determined activity category.

Steps 20 and 50, in which the encoder or decoder determines an activity category for each block of the frame or slice, may each comprise a series of sub-steps in some embodiments. For example, in one embodiment these steps may comprise determining an activity value for the block of pixels; determining a quantization parameter used in the block of pixels; and determining the activity category for the block of pixels based on the activity value and the quantization parameter for that block of pixels. Those skilled in the art will appreciate that the activity of a block of pixels is a well-known concept, related to the variance of the pixels belonging to the block. Media coding standards may set out one or more defined algorithms for calculating the activity value for a block of pixels. The present disclosure is not limited in that respect.

The activity category may be determined by weighting the activity value for the block of pixels as a function of the quantization parameter, and then mapping the weighted activity value (also referred to as the activity related parameter herein) to one of the plurality of activity categories. For example, in one embodiment the activity value is weighted as a function of the quantization parameter by dividing the activity value by a factor $A*2^{\Delta QP*B}$, where A and B are constants or variable. In one embodiment, the activity-related parameter is the activity divided by $$2^{\frac{QP}{6}}.$$

In one embodiment, the weighted activity value or activity related parameter is calculated (by the encoder or decoder) as described below:
1. Calculate the average activity of each block (e.g., 2×2) in a frame, as well as the average weighted activity: the average of $$\left(\text{activity}\Big/2^{\frac{\Delta QP}{6}}\right),$$

where $\Delta QP$ is the QP in the block minus the frame QP (where the frame QP is a constant value for the frame).
2. Divide the average activity by the average weighted activity to obtain a scaling factor, SF.
3. When categorizing each block, replace the old activity metric with $$SF*\text{activity}\Big/2^{\frac{\Delta QP}{6}}.$$

In an alternative embodiment, $\Delta QP$ is replaced by $$BlockQP-SliceQP+\frac{SliceQP-ISliceQP}{2},$$

where ISliceQP is the QP of the previously coded I-slice, but only for blocks which contain a transform. Here, BlockQP refers to the QP used for the coding unit (CU) the block belongs to, and SliceQP is the QP of the current slice. For blocks without a transform, $\Delta QP$ may be calculated as BlockQP−SliceQP.

Thus, $$2^{\left(BlockQP-SliceQP+\frac{SliceQP-ISliceQP}{2}\right)}$$

can be re-written as $$2^{(BlockQP-SliceQP)} \cdot 2^{\frac{SliceQP-ISliceQP}{2}}.$$

BlockQP−SliceQP corresponds to $\Delta QP$, and $$2^{\frac{SliceQP-ISliceQP}{2}}$$

is constant within a frame, and is therefore comprised in A. This implies that B varies depending on whether the block contains a transform.

In an alternative embodiment, the $\Delta QP$ calculation (or the denominator 6 in $$2^{\frac{\Delta QP}{6}}\right)$$

is also different based on whether a particular block uses intra- or inter-prediction, i.e., the constant B may vary depending on whether the block uses intra- or inter-prediction. For example, blocks with intra prediction may use $$\text{activity}\Big/2^{\frac{\Delta QP}{5}}$$

but blocks with inter prediction may use $$\text{activity}\Big/2^{\frac{\Delta QP}{7}}$$

for categorization.

It should be noted that A and B may differ between the frames, and/or differ depending on frame parameters such as prediction type.

It will be understood by those skilled in the art that references to division, or implementations of equations comprising a division operation, may be implemented using multiplication by the reciprocal of the divisor. For example, instead of dividing by a factor x, the implementation may instead multiply by 1/x. These operations are equivalent. The multiplication may be performed using bitwise shifts, and possibly preset rounding values to ensure correct rounding.

In steps 30 and 60, the encoder or decoder thus selects a filter based on the activity value and the quantization parameter (e.g. on the weighted activity value as described above, as mapped to an activity category), and applies the selected filter to the block of pixels. In one embodiment, the encoder or decoder may further select the filter based on a direction or orientation of the block of pixels. For example, different filters may be associated with different combinations of activity and orientation categories. In one embodiment, the encoder or decoder selects between five activity categories, and four orientation categories, implying a total of 20 different filters.

FIGS. 2a and 2b thus show methods of adaptive loop filtering in an encoder and a decoder, in which an activity value for a block of pixels may be weighted based on the quantization parameter for that block of pixels. One advantage of these methods is that adaptive loop filtering can be made more efficient when Adaptive QP is used. This is important since although the reference encoder does not use adaptive QP by default, most commercially viable encoders do. In addition, the performance of adaptive loop filtering on pictures higher up in the temporal hierarchy can be improved, increasing performance even when Adaptive QP is not used.

Figure 3A:
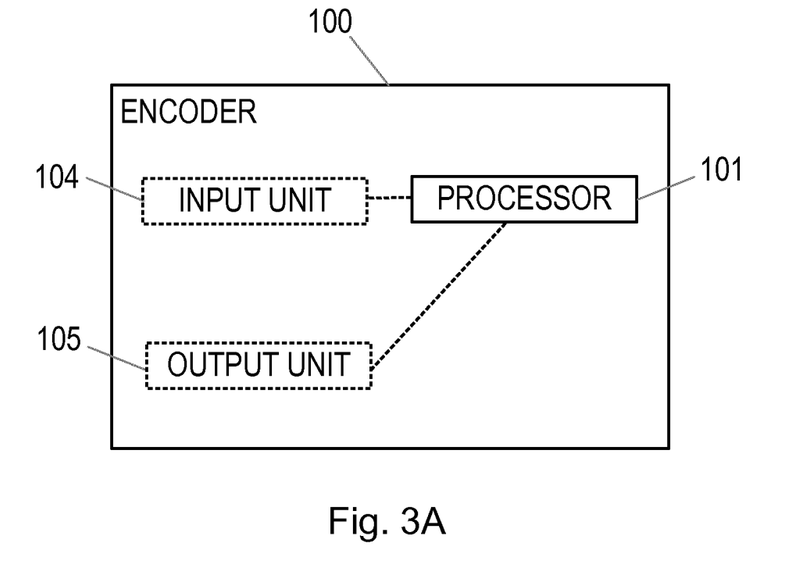
FIG. 3a is a schematic diagram of an encoder according to embodiments of the disclosure.

FIG. 3a shows an encoder 100 according to embodiments of the disclosure. The encoder 100 may be configured to perform the method described above with respect to FIG. 2a. The encoder 100 may comprise an adaptive loop filter. The encoder 100 may be configured to determine filter parameters for different filters to be used in a frame, to determine an activity category for each block of the frame, based on an activity related parameter wherein the activity related parameter is an activity divided by $A*2^{\Delta QP*B}$. The encoder 100 may further be configured to apply filter parameters of a filter from said different filters on the block based at least on the determined activity category.

In the illustrated embodiment, the encoder 100 comprises an adaptive loop filter and a processor 101. The processor may be configured to determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

In the illustrated embodiment, the encoder 100 also comprises an input unit 104 configured to receive the video to be encoded and an output unit 105 configured to output an encoded bitstream.

The input unit 104 may be in the form of a general input unit, in particular in the case of a wired connection to external devices. Alternatively, the input unit 104 may be in the form of a receiver or transceiver, in particular in the case or a wireless connection to external devices. Correspondingly, the output unit 105 may be in the form of a general output unit, in particular in the case of a wired connection to external devices. Alternatively, the output unit 105 may be in the form of a transmitter or transceiver, in particular in the case or a wireless connection to external devices.

The input unit 104 of the encoder may be connected to the processor 101 and the processor 101 may be connected to the output unit 105 to forward the encoded bitstream to, for instance, a decoder.

In alternative embodiments, the encoder 100 may comprise one or more modules configured to implement the methods described above with respect to FIG. 2a. The modules may be implemented purely in software, purely in hardware, or in a combination of both software and hardware. For example, the encoder 100 may comprise a first module configured to determine filter parameters for a plurality of filters to be used in encoding a frame or slice; a second module configured to determine respective activity values for each of a plurality of blocks in the frame or slice, wherein each block comprises a plurality of pixels; a third module configured to determine respective quantization parameters for each of the plurality of blocks; a fourth module configured to select, for each of the plurality of blocks, a filter from the plurality of determined filters based on the respective activity value and the respective quantization parameter; and a fifth module configured to apply the filter parameters for the respective selected filters to the plurality of blocks.

Figure 3B:
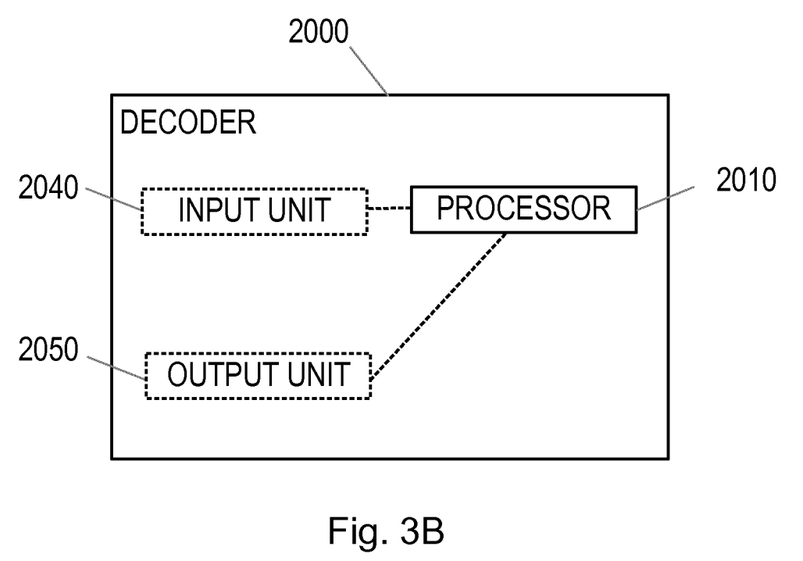
FIG. 3b is a schematic diagram of a decoder according to embodiments of the disclosure.

FIG. 3b shows a decoder 2000 according to embodiments of the disclosure. The decoder 2000 may be configured to perform the method described above with respect to FIG. 2b. The decoder 2000 may comprise an adaptive loop filter. The decoder 2000 may be configured to receive filter parameters for different filters to be used in a frame, to determine an activity category for each block of the frame, based on an activity related parameter wherein the activity related parameter is an activity divided by $A*2^{\Delta QP*B}$. The decoder 2000 may further be configured to apply filter parameters of a filter from said different filters on the block based at least on the determined activity category.

In the illustrated embodiment, the decoder 2000 comprises an adaptive loop filter and a processor 2010. The processor may be configured to receive filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

In the illustrated embodiment, the decoder 2000 also comprises an input unit 2040 configured to receive the encoded bitstream and an output unit 2050 configured to output a decoded bitstream, e.g., to a display.

The input unit 2040 may be in the form of a general input unit, in particular in the case of a wired connection to external devices. Alternatively, the input unit 2040 may be in the form of a receiver or transceiver, in particular in the case or a wireless connection to external devices. Correspondingly, the output unit 2050 may be in the form of a general output unit, in particular in the case of a wired connection to external devices. Alternatively, the output unit 2050 may be in the form of a transmitter or transceiver, in particular in the case or a wireless connection to external devices.

The input unit 2040 of the decoder may be connected to the processor 2010 and the processor 2010 may be connected to the output unit 2050 to forward the decoded bitstream to, for instance, a display.

In alternative embodiments, the decoder 2000 may comprise one or more modules configured to implement the methods described above with respect to FIG. 2b. The modules may be implemented purely in software, purely in hardware, or in a combination of both software and hardware. For example, the decoder 2000 may comprise a first module configured to receive filter parameters for a plurality of filters to be used in encoding a frame or slice; a second module configured to determine respective activity values for each of a plurality of blocks in the frame or slice, wherein each block comprises a plurality of pixels; a third module configured to determine respective quantization parameters for each of the plurality of blocks; a fourth module configured to select, for each of the plurality of blocks, a filter from the plurality of determined filters based on the respective activity value and the respective quantization parameter; and a fifth module configured to apply the filter parameters for the respective selected filters to the plurality of blocks.

Particular examples of suitable hardware circuitry for the encoder 100 or the decoder 2000 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more FPGAs, or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 4A:
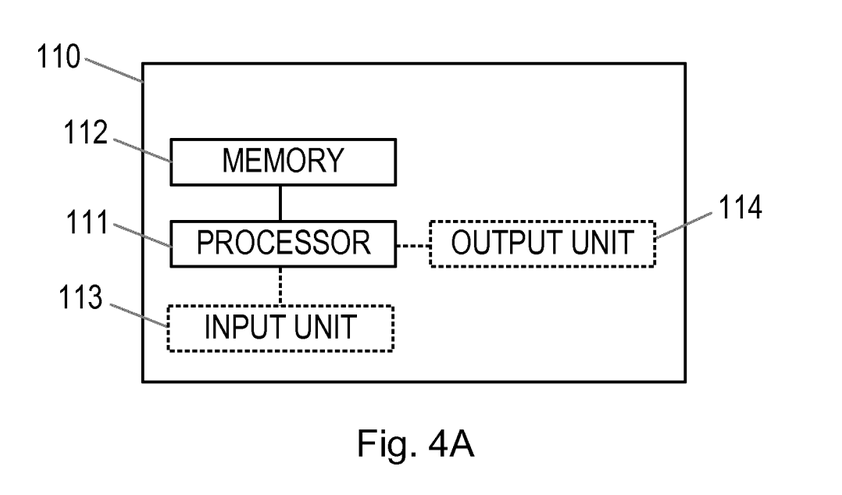
FIG. 4a is a schematic diagram of an encoder according to further embodiments of the disclosure.

FIG. 4a is a schematic diagram of an encoder 110 according to an alternative embodiment of the disclosure. The encoder may be configured to perform the method set out in FIG. 2a, for example.

The encoder 110 comprises a processor 111 and a memory 112 comprising instructions executable by the processor 111, so as to cause the processor 111 to determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

The encoder 110 may additionally comprise an input unit 113 and an output unit 114, substantially as described above with respect to input unit 104 and output unit 105.

Figure 4B:
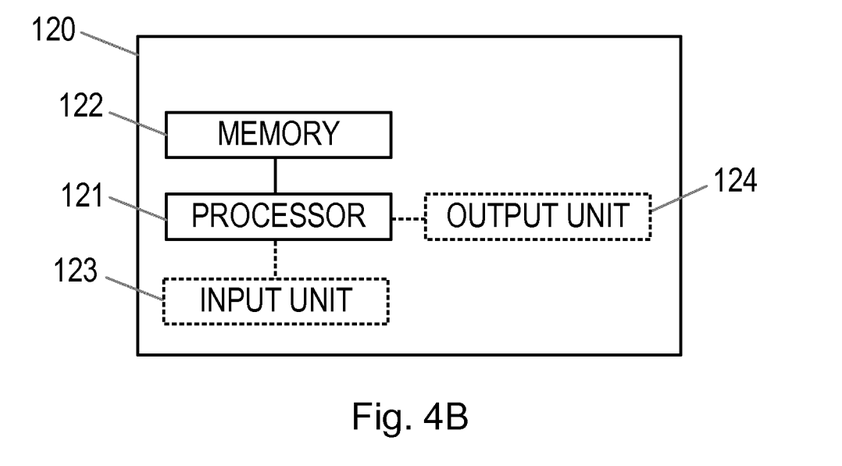
FIG. 4b is a schematic diagram of a decoder according to further embodiments of the disclosure.

FIG. 4b is a schematic diagram of a decoder 120 according to an alternative embodiment of the disclosure. The encoder may be configured to perform the method set out in FIG. 2b, for example.

The decoder 120 comprises a processor 121 and a memory 122 comprising instructions executable by the processor 121, so as to cause the processor 121 to receive filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

The decoder 120 may additionally comprise an input unit 123 and an output unit 124, substantially as described above with respect to input unit 2040 and output unit 2050.

Figure 5:
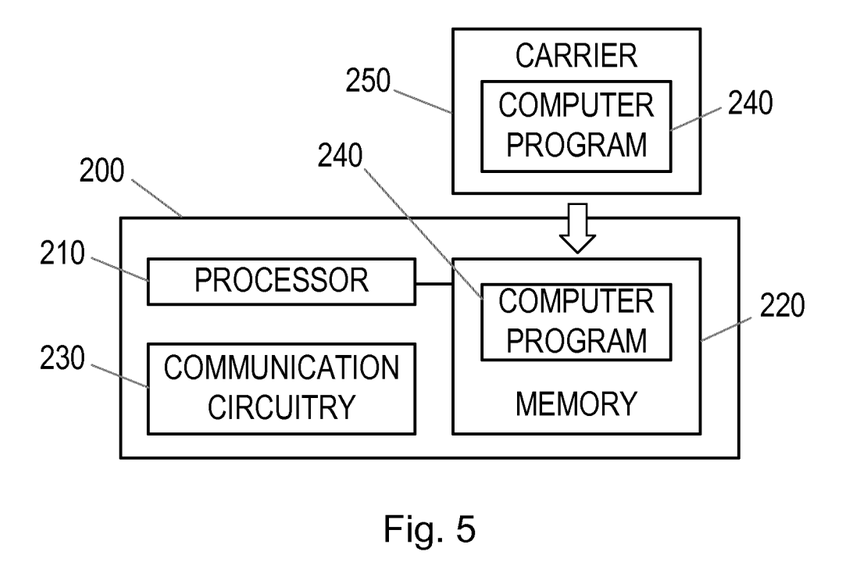
FIG. 5 is a schematic diagram of a user equipment according to embodiments of the disclosure.

FIG. 5 is a schematic block diagram illustrating an example of a user equipment (UE) 200 comprising a processor 210, an associated memory 220 and communication circuitry 230.

In this particular example, at least some of the steps, functions, procedures, modules and/or blocks described herein are implemented in a computer program 240, which is loaded into the memory 220 for execution by processing circuitry including one or more processors 210. For example, where the user equipment 200 is operative as an encoder, the computer program 240 may comprise instructions executable by the processor 210, so as to cause the processor 210 to determine filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks. Where the user equipment 200 is operative as a decoder, the computer program 240 may comprise instructions executable by the processor 210, so as to cause the processor 210 to receive filter parameters for a plurality of filters to be used in encoding a frame or slice; determine respective activity values for each of a plurality of blocks in the frame or slice, wherein each block comprises a plurality of pixels; determine respective quantization parameters for each of the plurality of blocks; select, for each of the plurality of blocks, a filter from the plurality of determined filters based on the respective activity value and the respective quantization parameter; and apply the filter parameters for the respective selected filters to the plurality of blocks.

In one embodiment, the user equipment 200 is operable as both an encoder and a decoder.

The processor 210 and memory 220 are interconnected to each other to enable normal software execution. Communication circuitry 230 is also interconnected to the processor 210 and/or the memory 220 to enable input and/or output of video data.

The user equipment 200 can be any device or apparatus that can receive and process video data. For instance, the user equipment 200 could be a computer, either stationary or portable, such as laptop, a smart phone, a tablet, a set-top box, a video camera, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein. The processing circuitry does not have to be dedicated to only execute the above-described steps, functions, procedure and/or blocks, but may also execute other tasks.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 240, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 in FIG. 19, for execution by the processor 210 thereof.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program miming on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein.

The present disclosure thus provides methods, apparatus and computer programs for adaptive loop filtering in an encoder and a decoder. The activity values of blocks of pixels are determined and weighted as a function of the quantization parameters of those blocks of pixels. In this way, adaptive loop filtering can be made more efficient when Adaptive QP is used.

The invention claimed is:

1. A method, performed by an encoder, for adaptive loop filtering, the method comprising:
   determining a first activity value for a first block in a frame or a slice, wherein the first block comprises a first plurality of pixels;
   determining a first quantization parameter (QP) value for the first block;
   calculating a weighted activity value using the first activity value and the first QP value as inputs to the calculation;
   selecting a filter from a plurality of filters based on the weighted activity value; and
   applying the selected filter to the first block.

2. A method, performed by a decoder, for adaptive loop filtering, the method comprising:
   determining a first activity value for a first block in a picture frame, wherein the first block comprises a first plurality of pixels;
   determining a first quantization parameter (QP) value for the first block;
   calculating a weighted activity value using the first activity value and the first QP value as inputs to the calculation;
   selecting a filter from a plurality of filters based on the weighted activity value; and
   applying the selected filters to the first block.

3. The method of claim 1, further comprising:
   categorizing each of a plurality blocks into one of a plurality of activity categories based on a respective activity value for each block and a respective QP value for each block, and
   selecting a filter for each of the plurality of blocks based on the respective activity category.

4. The method of claim 3, wherein the step of categorizing each block into one of the plurality of activity categories comprises:
   weighting the respective activity value for each block as a function of the respective QP value for each block, to generate a respective weighted activity value for each block; and
   categorizing each block into one of the plurality of activity categories based on the respective weighted activity value.

5. The method of claim 4, wherein the respective activity value for each block is weighted by dividing the respective activity value by a factor $A2^{\Delta QP*B}$, wherein $\Delta QP$ comprises a difference between the QP value of the respective block and a QP value for the frame or the slice, and wherein A and B are parameters.

6. The method of claim 5, wherein the parameter A varies as a function of an average activity value of the plurality of blocks and an average weighted activity value of the plurality of blocks.

7. The method of claim 6, wherein
   the parameter A varies as a function of a ratio of the average activity value of the plurality of blocks and the average weighted activity value of the plurality of blocks, and/or
   the parameter B varies as a function of whether the respective block uses intra- or inter-prediction.

8. The method of claim 5, wherein the parameter A comprises a factor $2^{((FrameQP-IframQP)/2)}$, wherein FrameQP is QP value for the frame or the slice, and wherein IFrameQP is a QP value for a previously coded I-frame or I-slice.

9. An encoder for adaptive loop filtering, the encoder comprising:
   a processor, configured to:
   determine a first activity value for a first block in a frame or a slice, wherein the first block comprises a first plurality of pixels;
   determine a first quantization parameter (QP) value for the first block;
   calculate a weighted activity value using the first activity value and the first QP value as inputs to the calculation;
   select a filter from a plurality of filters based on the weighted activity value; and
   apply the selected filter to the first block.

10. The encoder of claim 9, further comprising:
    an input unit, for receiving a video stream to be encoded, the video stream comprising the frame or the slice; and
    an output unit, for outputting an encoded bitstream,
    wherein the processor is configured to encode the video stream.

11. A decoder for adaptive loop filtering, the decoder comprising:
a processor, configured to:
determine a first activity value for a first block in a picture frame, wherein the first block comprises a first plurality of pixels;
determine a first quantization parameter (QP) value for the first block;
calculating a weighted activity value using the first activity value and the first QP value as inputs to the calculation;
select a filter from a plurality of filters based on the weighted activity value; and
apply the selected filter to the first block.

12. The decoder of claim 11, further comprising:
an input unit, for receiving an encoded bitstream; and
an output unit, for outputting a decoded bitstream,
wherein the processor is configured to decode the encoded bitstream.

13. The decoder of claim 11, wherein the processor is further configured to:
categorize each of a plurality of blocks into one of a plurality of activity categories based on a respective activity value for each block and a respective QP value for each block, and
selecting a filter for each of the plurality of blocks based on the respective activity category.

14. The decoder of claim 13, wherein the processor is configured to categorize each of the plurality of blocks into one of the plurality of activity categories by:
weighting the respective activity value for each block as a function of the respective QP value for each block, to generate a respective weighted activity value for each block; and
categorizing each block into one of the plurality of activity categories based on the respective weighted activity value.

15. The decoder of claim 14, wherein the respective activity value for each block is weighted by dividing the respective activity value by a factor $A2^{\Delta QP*B}$, wherein $\Delta QP$ comprises a difference between the QP value of each block and a QP value for the frame or the slice, and wherein A and B are parameters.

16. The decoder of claim 15, wherein
the parameter A varies as a function of an average activity value of the plurality of blocks and an average weighted activity value of the plurality of blocks, and/or
the parameter B varies as a function of whether the respective block uses intra- or inter-prediction.

17. The decoder of claim 16, wherein the parameter A varies as a function of a ratio of the average activity value of the plurality of blocks and the average weighted activity value of the plurality of blocks.

18. The decoder of claim 15, wherein the parameter A comprises a factor $$2^{\frac{FrameQP-IFrameQP}{2}},$$

wherein FrameQP is the QP value for the frame or slice, and wherein IFrameQP is a QP value for a previously coded I-frame or I-slice.

19. A computer program product comprising a non-transitory computer-readable medium storing instructions which, when executed by processing circuitry in an encoder, causes the encoder to perform the method of claim 1.

20. A computer program product comprising a non-transitory computer-readable medium storing instructions which, when executed by processing circuitry in a decoder, causes the decoder to perform the method of claim 2.

21. The method of claim 1, wherein
the first block includes a first pixel and a second pixel; and
the first activity value of the first block is calculated based on (i) a first horizontal value associated with the first pixel, (ii) a second horizontal value associated with the second pixel; (iii) a first vertical value associated with the first pixel; and (iv) a second vertical value associated with the second pixel.

* * * * *